R. E. McCONLEY.
SNOWPLOW.
APPLICATION FILED DEC. 18, 1920.

1,406,993.

Patented Feb. 21, 1922.

Inventor,
R. E. McConley
By C. A. Snow & Co.
Attorneys.

UNITED STATES PATENT OFFICE.

ROBERT E. McCONLEY, OF WHITCOMB, WISCONSIN.

SNOWPLOW.

1,406,993.　　　Specification of Letters Patent.　　Patented Feb. 21, 1922.

Application filed December 18, 1920. Serial No. 431,626.

*To all whom it may concern:*

Be it known that I, ROBERT E. MCCONLEY, a citizen of the United States, residing at Whitcomb, in the county of Shawano and State of Wisconsin, have invented a new and useful Snowplow, of which the following is a specification.

This invention relates to snow plows, the primary object of the invention being to provide a snow plow especially designed for use in connection with tractors.

Another object of the invention is to provide a plow of this character having an adjustable scoop forming a part thereof.

A still further object of the invention is to provide novel means for connecting the tractor and plow to eliminate any possibility of the plow and tractor becoming disconnected.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1:
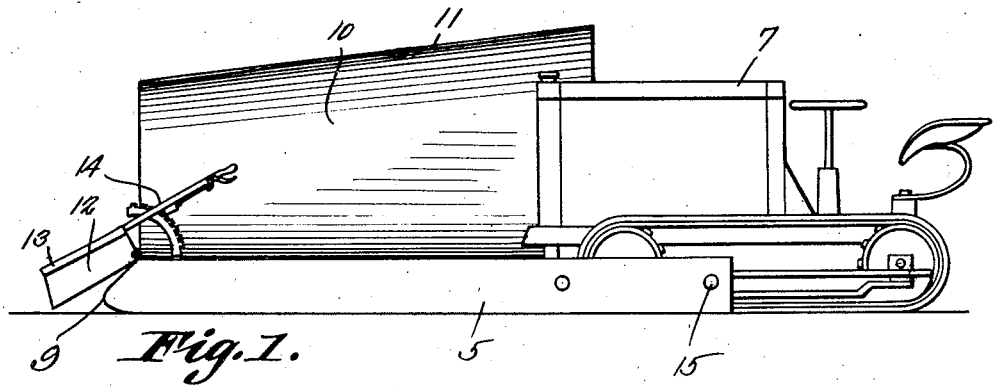
Figure 1 illustrates a side elevational view of a snow plow constructed in accordance with the present invention, and showing a tractor as connected thereto.
Figure 2:
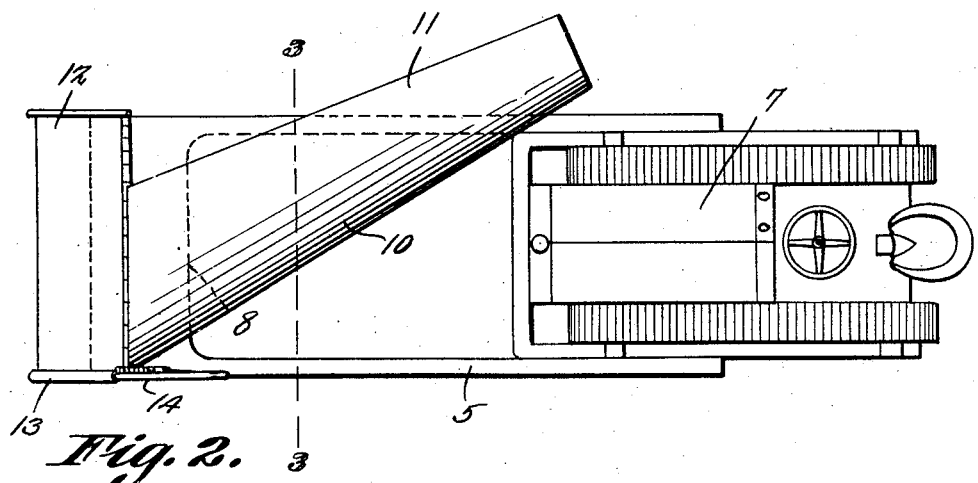
Figure 2 illustrates a plan view of the same.
Figure 3:
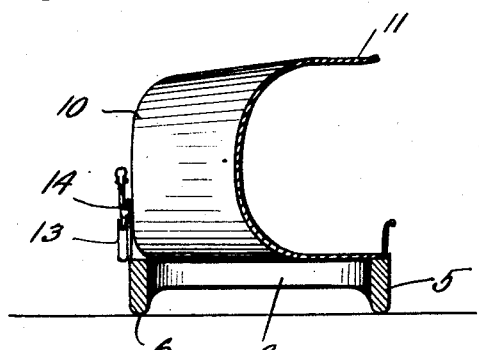
Figure 3 illustrates a sectional view taken on line 3—3 of Figure 2.

Referring to the drawing in detail, the plow includes the runners 5 which have their ground engaging portions thereof curved as at 6 to permit the plow to be readily and easily turned to insure the efficient operation of the device.

These runners 5 are disposed in spaced relation with each other, and are arranged a predetermined distance apart to receive the forward end of a tractor which in the present showing is indicated by the reference character 7, the tractor 7 being however of any conventional design.

The forward portions of the runners 5 are connected as at 8, the forward portions adjacent to the ground engaging surfaces thereof being curved as at 9 to cause the runners to pass over obstructions on the ground surface over which the same operate.

Forming a part of the plow, is a mold board 10 which extends at an angle with respect to the runners 5, the same being curved to provide an upper flange 11, which flange throws the snow laterally of the plow and deposits the same in close proximity to the sides of the plow.

Hingedly connected to the forward portion of the plow, is a scoop member 12, which is of a width equal to the width of the plow and is provided with the flanges 13 to prevent the snow from moving laterally over the scoop, when the plow is in operation, there being provided however an operating lever 14 for adjusting the scoop to various angles.

The plow has connection with the tractor by means of the bolts 15 which pass through the runners of the plow and connect with the side rails of the running gear of the tractor.

It is therefore obvious that when the plow is to be used, the tractor is positioned between the runners of the plow and secured thereto as stated.

Having thus described the invention, what is claimed as new is:—

A snow plow, spaced runners connected at their forward ends, a mold board having connection with the runners and extending upwardly and outwardly therefrom, said mold board being of a width to extend across the entire width of the forward portions of the runners, said mold board being disposed at an angle with respect to the runners, a scoop member pivotally connected with the runners adjacent to the forward ends thereof, said scoop members extending across the forward ends of the runners, an operating lever having connection with the scoop for adjusting the same and holding the same against movement, and the runners being constructed to receive a power device therebetween.

In testimony that I claim the foregoing as my own, I have hereto affixed my signature in the presence of two witnesses.

ROBERT E. McCONLEY.

Witnesses:
W. E. WILSON,
CLARA DRAEGER.